US011683521B2

(12) United States Patent
Li et al.

(10) Patent No.: US 11,683,521 B2
(45) Date of Patent: *Jun. 20, 2023

(54) REPRESENTATIVE MOTION INFORMATION FOR TEMPORAL MOTION PREDICTION IN VIDEO ENCODING AND DECODING

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,997

(22) Filed: Dec. 28, 2021

(65) Prior Publication Data

US 2022/0124367 A1 Apr. 21, 2022

Related U.S. Application Data

(63) Continuation of application No. 16/735,486, filed on Jan. 6, 2020, now Pat. No. 11,245,923, which is a continuation of application No. 15/862,025, filed on Jan. 4, 2018, now Pat. No. 10,531,118, which is a continuation of application No. 13/339,292, filed on Dec. 28, 2011, now Pat. No. 9,900,615.

(51) Int. Cl.
*H04N 19/573* (2014.01)
*H04N 19/513* (2014.01)
*H04N 19/52* (2014.01)
*H04N 19/174* (2014.01)

(52) U.S. Cl.
CPC ........ *H04N 19/573* (2014.11); *H04N 19/174* (2014.11); *H04N 19/52* (2014.11)

(58) Field of Classification Search
CPC ..... H04N 19/573; H04N 19/174; H04N 19/52
USPC .................................................. 375/240.16
See application file for complete search history.

(56) References Cited

U.S. PATENT DOCUMENTS

2013/0308704 A1\* 11/2013 Park ...................... H04N 19/51
375/240.16
2013/0329797 A1\* 12/2013 Sugio .................... H04N 19/52
375/240.15

(Continued)

FOREIGN PATENT DOCUMENTS

WO   WO-2012108700 A2 \*  8/2012   ........... H04N 19/105
WO   WO-2012108701 A2 \*  8/2012   ........... H04N 19/109

*Primary Examiner* — Albert Kir
(74) *Attorney, Agent, or Firm* — Klarquist Sparkman, LLP

(57) ABSTRACT

Disclosed herein are representative embodiments of generating representative motion information that can be used during processing of a video frame. In one exemplary embodiment disclosed herein, a reference frame comprising a group of blocks is processed, and motion information for the group of blocks is compressed at least by buffering representative motion-vector information and representative reference-frame index information for the group of blocks. The representative reference-frame index information comprises reference-frame index information of a representative block of the group of blocks, and the representative reference-frame index information represents reference-frame index information for the group of blocks during processing of a current frame.

20 Claims, 10 Drawing Sheets

(56) References Cited

U.S. PATENT DOCUMENTS

| | | | |
|---|---|---|---|
| 2013/0336406 A1* | 12/2013 | Zhang | H04N 19/597 375/240.16 |
| 2021/0274201 A1* | 9/2021 | Xu | H04N 19/82 |
| 2021/0274212 A1* | 9/2021 | Liu | H04N 19/184 |

* cited by examiner

REPRESENTATIVE MOTION INFORMATION FOR TEMPORAL MOTION PREDICTION IN VIDEO ENCODING AND DECODING

CROSS REFERENCE TO RELATED APPLICATIONS

This application is a continuation of U.S. patent application Ser. No. 16/735,486, filed Jan. 6, 2020, which is a continuation of U.S. patent application Ser. No. 15/862,025, filed Jan. 4, 2018, now U.S. Pat. No. 10,531,118, which is a continuation of U.S. patent application Ser. No. 13/339,292, filed Dec. 28, 2011, now U.S. Pat. No. 9,900,615, the disclosure of which is hereby incorporated by reference.

FIELD

The field relates to video encoding and decoding, and in particular, to representative motion information for use in video encoding and decoding.

BACKGROUND

As the use of video has become more popular in today's world, video has become available in a wide variety of video formats. These video formats are provided by using traditional video coding techniques that are able to compress video for storage and transmission, and are able to decompress video for viewing. Compression and decompression of video consumes computing resources and time. Although traditional video coding techniques can be used to encode and decode video, such techniques are limited and are often computationally inefficient.

SUMMARY

Among other innovations described herein, this disclosure presents various tools and techniques for representing and using motion information during video encoding and/or decoding. For instance, certain embodiments of the disclosed technology store and use representative motion information in a computationally efficient manner during processing of video information, thereby saving memory resources.

In one exemplary technique described herein, a reference frame comprising a group of blocks is processed. Also, motion information for the group of blocks is compressed at least by buffering representative motion-vector information and representative reference-frame index information for the group of blocks. The representative reference-frame index information includes reference-frame index information of a representative block of the group of blocks, and the representative reference-frame index information represents reference-frame index information for the group of blocks during processing of a current frame.

In another exemplary technique described herein, at least a portion of a compressed video bitstream is received. Also, representative motion-vector information and representative reference-frame index information for a group of blocks in a reference frame is buffered. The representative reference-frame index information includes reference-frame index information of a representative block of the group of blocks. Additionally, a current frame is decoded, and the representative reference-frame index information includes the reference-frame index information for the group of blocks that is buffered in the buffer during the decoding of the current frame. Further, decoded video information for the current frame is stored.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

I. General Considerations

Disclosed below are representative embodiments of methods, apparatus, and systems for determining and using representative motion information during video encoding and/or decoding. The disclosed methods, apparatus, and systems should not be construed as limiting in any way. Instead, the present disclosure is directed toward all novel and nonobvious features and aspects of the various disclosed embodiments, alone and in various combinations and sub-combinations with one another. Furthermore, any features or aspects of the disclosed embodiments can be used alone or in various combinations and sub-combinations with one another. The disclosed methods, apparatus, and systems are not limited to any specific aspect or feature or combination thereof, nor do the disclosed embodiments require that any one or more specific advantages be present or problems be solved Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

II. Exemplary Encoders and Decoders

A. Overview

Figure 1:
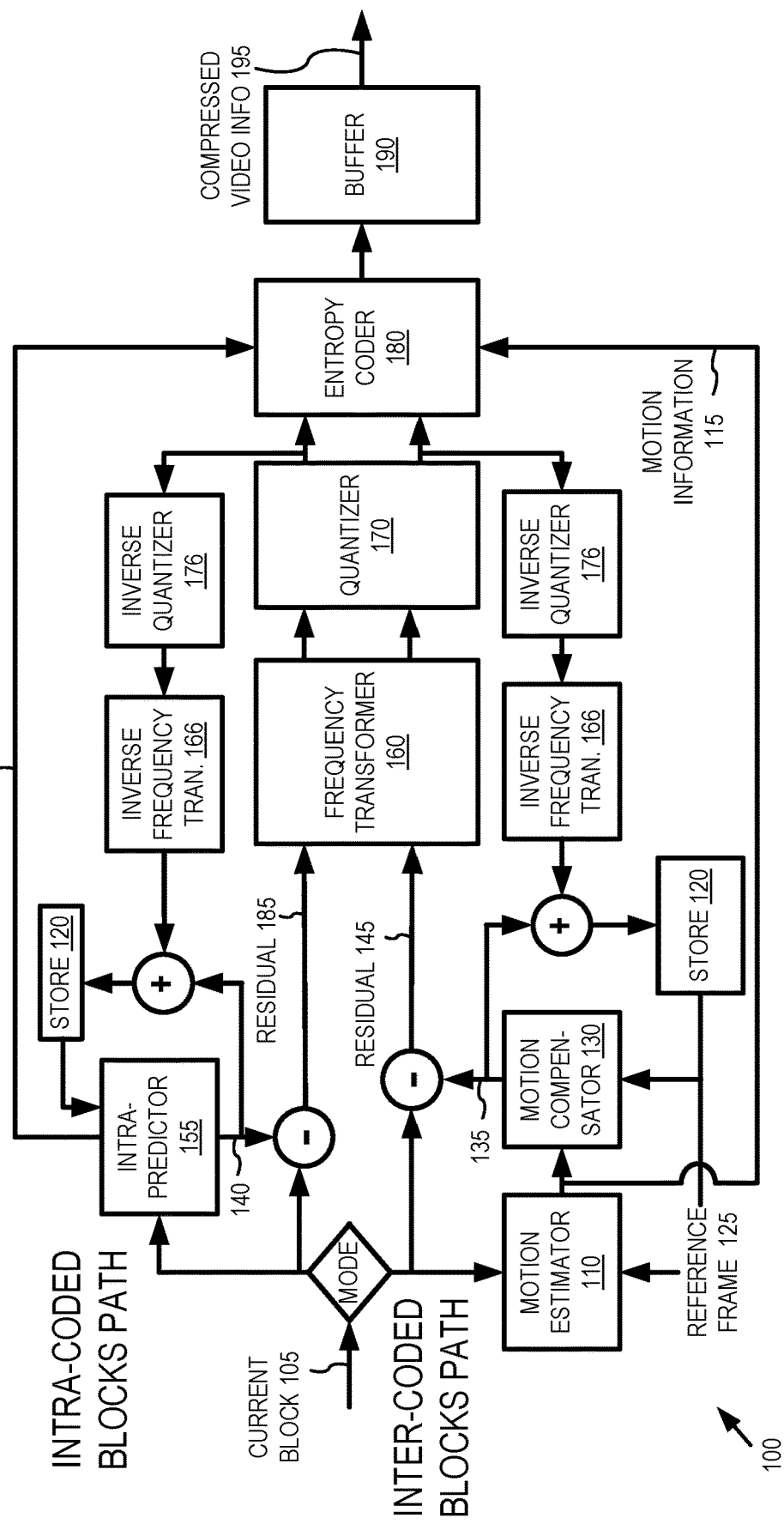
FIG. 1 is a schematic diagram of a generalized example of a suitable video encoder system for use with certain disclosed embodiments.
Figure 2:
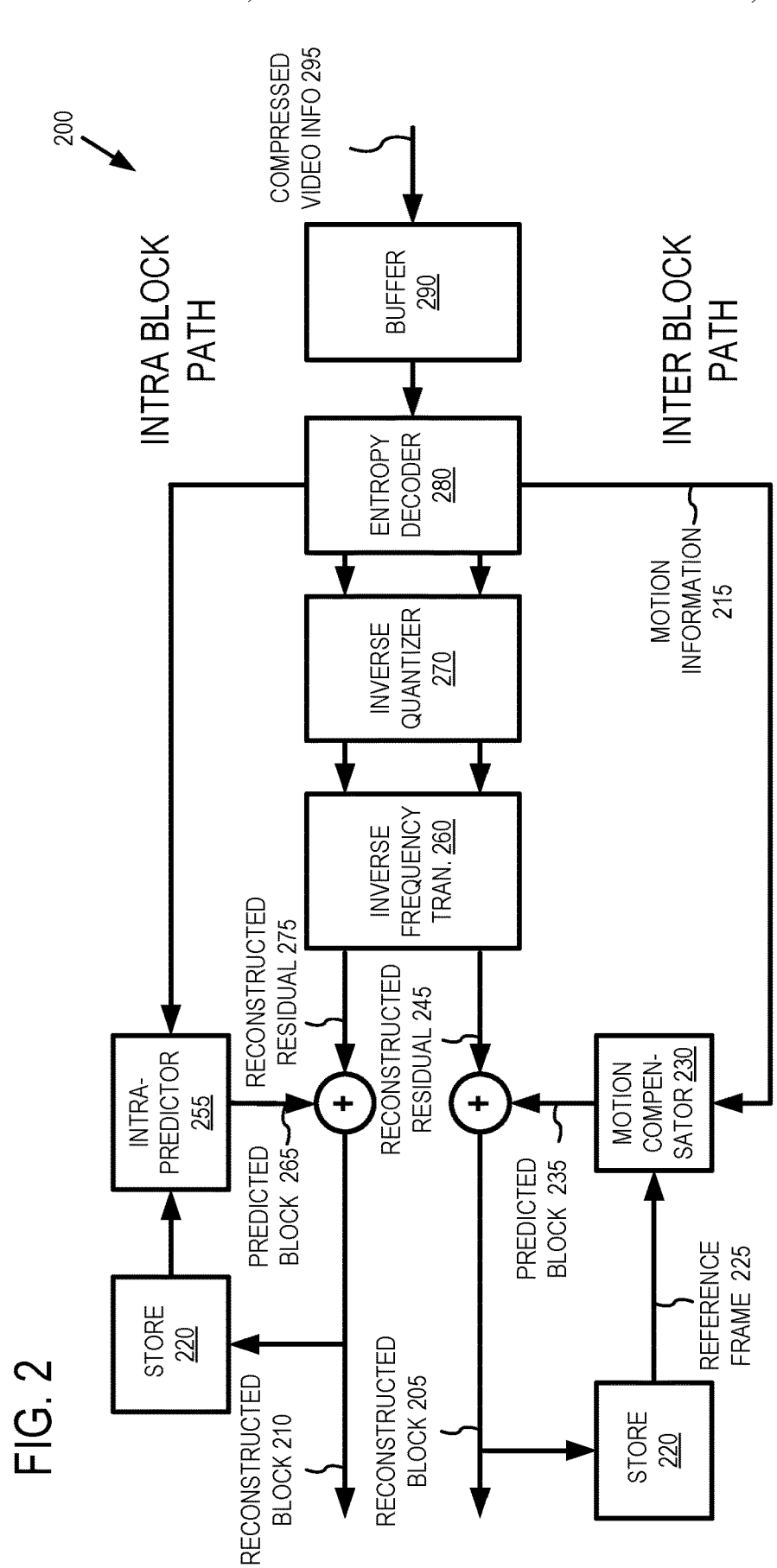
FIG. 2 is a schematic diagram of a generalized example of a suitable video decoder system for use with certain disclosed embodiments.

FIG. 1 is a schematic diagram of a generalized video encoder system 100, and FIG. 2 is a schematic diagram of a video decoder system 200, in conjunction with which various described embodiments may be implemented.

The relationships shown between modules within the encoder and decoder indicate the flow of information in the encoder and decoder; other relationships are not shown for the sake of simplicity. In particular, FIGS. 1 and 2 usually do not show side information indicating the encoder settings, modes, tables, etc. used for a video sequence, frame, macroblock, slice, block, etc. Such side information is sent in the output bitstream, typically after entropy encoding of the side information. The format of the output bitstream can be the High-Efficiency Video Coding (HEVC) format or another video coding format.

Depending on the implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

B. Exemplary Video Encoder

FIG. 1 is a schematic diagram of a generalized video encoder system 100 that can store and use representative motion information as described below. The encoder system 100 receives a sequence of video frames including a current frame 105, and produces compressed video information 195 as output. For example, the compressed video information can be a compressed video bitstream, and a video frame can be a picture in the sequence of pictures in the video. Particular embodiments of video encoders can use a variation or supplemented version of the generalized encoder 100.

The encoder system 100 can compress frames of a video sequence (e.g., predicted frames and key frames). For the sake of presentation, FIG. 1 shows a path for encoding blocks of a frame using inter-prediction through the encoder system 100 (shown as the inter-coded blocks path) and a path for encoded blocks of a frame using intra-prediction (shown as the intra-coded blocks path). Many of the components of the encoder system 100 can be used for compressing both inter-predicted and intra-predicted blocks. In the illustrated embodiments, components that can be shared are labeled with the same number, though it is to be understood that each path can be implemented using separate dedicated components as well. The exact operations performed by those components can vary depending on the type of information being compressed.

An inter-coded block is represented in terms of prediction (or difference) from one or more other blocks. A prediction residual is the difference between what was predicted and the original block. In contrast, an intra-coded block is compressed without reference to other frames. When encoding a block, the encoder system 100 can choose to encode the block using an inter-prediction mode and/or an intra-prediction mode.

If a current block 105 is to be coded using inter-prediction, a motion estimator 110 estimates motion of the current block 105, or sets of pixels of the current block 105 with respect to a reference frame using motion information, where the reference frame is a previously reconstructed frame 125 buffered in the store 120. The motion information for the reference frame can also be buffered. In some implementations, motion information is buffered as representative motion information. In alternative embodiments, the reference frame is a temporally later frame or the current block is bi-directionally predicted. The motion estimator 110 outputs as side information motion information 115, such as motion vectors, inter-prediction directions, and/or reference frame indices. A motion compensator 130 applies the motion information 115 to the reconstructed previous decoded frame (the reference frame) 125 to form a motion-compensated current block 135. The prediction is rarely perfect, however, and the difference between the motion-compensated current block 135 and the original current block 105 is the prediction residual 145. Alternatively, a motion estimator and motion compensator apply another type of motion estimation/compensation.

If the current block 105 is to be coded using intra-prediction, an intra-predictor 155 creates an intra-predicted current block prediction 140 from stored pixels of the frame that includes the current block 105, and the stored pixels are previously reconstructed pixels buffered in the store 120. The intra-predictor 155 can output side information such as intra-prediction direction 158. The prediction is rarely perfect, however, and the difference between the stored pixels and the original current block 105 is the prediction residual 185.

A frequency transformer 160 converts the spatial domain video information into frequency domain (e.g., spectral) data using a frequency transform. A quantizer 170 then quantizes the blocks of spectral data coefficients.

When a reconstructed current block or frame is needed for subsequent motion estimation/compensation and/or intra-prediction, an inverse quantizer 176 performs inverse quantization on the quantized spectral data coefficients. An inverse frequency transformer 166 then performs the inverse of the operations of the frequency transformer 160, producing a reconstructed residual (for a predicted frame) or a reconstructed key frame. If the current block 105 was coded using inter-prediction, the reconstructed prediction residual is added to the motion-compensated current block 135 to form the reconstructed current block. If the current block 105 was coded using intra-prediction, the reconstructed prediction residual is added to the intra-predicted current block prediction 140 to form the reconstructed current block. The store 120 can buffer the reconstructed current block for use in predicting subsequent frames or blocks.

The entropy coder 180 compresses the output of the quantizer 170 as well as certain side information (e.g., motion information 115, modes, quantization step size). Typical entropy coding techniques include arithmetic coding, variable length coding, differential coding, Huffman coding, run length coding, LZ coding, dictionary coding, and combinations of the above.

The entropy coder 180 stores compressed video information 195 in the buffer 190. The compressed video information 195 is depleted from the buffer 190 at a constant or relatively constant bit rate and stored for subsequent streaming at that bit rate. Alternatively, the encoder system 100 streams compressed video information immediately following compression.

The encoder 100 can produce a bitstream, perform motion vector prediction, and store and use representative motion information as described below. The encoder may also use the techniques described herein in various combinations, individually, or in conjunction with other techniques. Alternatively, another encoder or tool performs one or more encoding techniques.

C. Exemplary Video Decoder

FIG. 2 is a schematic diagram of a general video decoder system 200 that can store and use representative motion information as described below. The decoder system 200 receives information 295 for a compressed sequence of video frames (e.g., via a compressed video bitstream) and produces output including a reconstructed block 205. Particular embodiments of video decoders can use a variation or supplemented version of the generalized decoder 200.

The decoder system 200 decompresses blocks coded using inter-prediction and intra-prediction. For the sake of presentation, FIG. 2 shows a path for intra-coded blocks through the decoder system 200 (shown as the intra block path) and a path for inter-coded blocks (shown as the inter block path). Many of the components of the decoder system 200 are used for decompressing both inter-coded and intra-coded blocks. The exact operations performed by those components can vary depending on the type of information being decompressed.

A buffer 290 receives the information 295 for the compressed video sequence and makes the received information available to the entropy decoder 280. The buffer 290 typically receives the information at a rate that is fairly constant over time. The buffer 290 can include a playback buffer and other buffers as well. Alternatively, the buffer 290 receives information at a varying rate.

The entropy decoder 280 entropy decodes entropy-coded quantized data as well as entropy-coded side information (e.g., motion information 215, flags, modes, and other side information), typically applying the inverse of the entropy encoding performed in the encoder. An inverse quantizer 270 inverse quantizes entropy-decoded data. An inverse frequency transformer 260 converts the quantized, frequency domain data into spatial domain video information by applying an inverse transform such as an inverse frequency transform.

If the block 205 to be reconstructed is an inter-coded block using forward-prediction, a motion compensator 230 applies motion information 215 to a reference frame 225 to form a prediction 235 of the block 205 being reconstructed. A buffer (store) 220 stores previous reconstructed frames for use as reference frames. Also, motion information for the reconstructed frames can be stored, and the stored motion information can include representative motion information. Alternatively, a motion compensator applies other types of motion compensation. The prediction by the motion compensator is rarely perfect, so the decoder 200 also reconstructs a prediction residual 245 to be added to the prediction 235 to reconstruct block 205.

When the decoder needs a reconstructed frame for subsequent motion compensation, the frame store 220 buffers the reconstructed frame for use in predicting a subsequent frame. In some implementations of predicting a frame, the frame is predicted on a block-by-block basis (as illustrated) and respective blocks of the frame can be predicted. One or more of the predicted blocks can be predicted using motion information from blocks in the same frame or one or more blocks of a different frame.

If the block 205 to be reconstructed is an intra-coded block, an intra-predictor 255 forms a prediction 265 of the block 210 being reconstructed. The buffer (store) 220 stores previous reconstructed blocks and frames. The prediction by the motion compensator is rarely perfect, so the decoder 200 also reconstructs a prediction residual 275 to be added to the prediction 265 to reconstruct block 210.

The decoder 200 can decode a compressed bitstream, perform motion vector prediction, and store and use representative motion information as described below. The decoder may also use the techniques described herein in various combinations, individually, or in conjunction with other techniques. Alternatively, another decoder or tool performs one or more decoding techniques.

II. Exemplary Embodiments of Storing and Using Motion Information

A. Exemplary Method of Compressing Motion Information

Motion information coding comprises a large portion of the total bit-rate in video coding, and efficient motion information coding can improve coding performance. Motion information can include one or more motion vectors, one or more reference-frame indices, and one or more coding modes. In some video coding designs, temporal motion information (e.g., motion information from other frames) is used to predict the motion information of a frame being currently decoded which can improve coding performance. During processing of video (e.g., during encoding or decoding of video information), one or more buffers can be maintained to store motion information for reference frames to be available for use in the processing of other frames.

Figure 3:
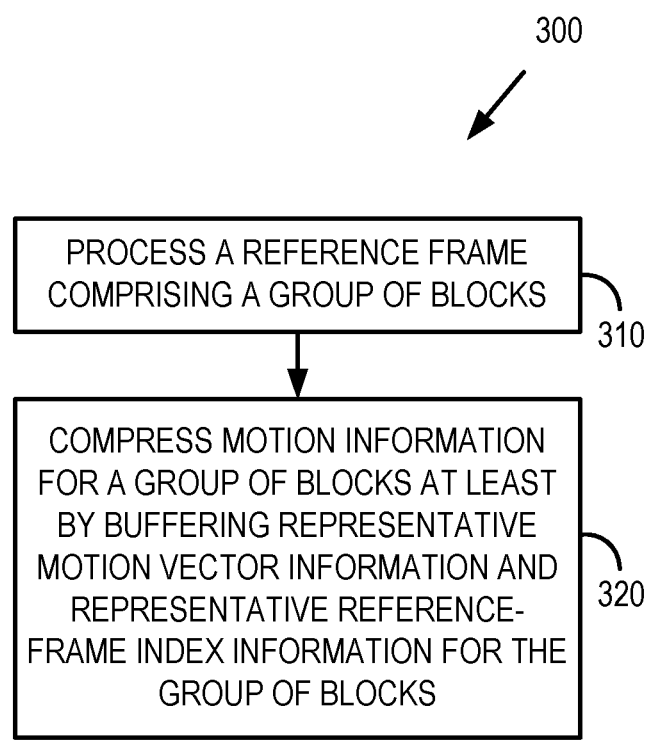
FIG. 3 is a flowchart of an exemplary method of compressing motion information.

FIG. 3 is a flowchart of an exemplary method 300 of compressing motion information. In the illustrated example, a reference frame that includes a group of blocks is processed at block 310. For example, the processing of the reference frame can include determining motion information for one or more blocks of the group of blocks that is encoded or decoded using inter prediction, and/or determining that one or more of the blocks of the group of blocks are intra-prediction mode blocks. At block 320, the motion information for the group of blocks is compressed at least by buffering representative motion-vector information and representative reference-frame index information and/or the mode information for the group of blocks. In one implementation, the selection of buffered reference-frame index information and/or coding-mode information matches the selection of the reference motion-vector information. For example, the motion-vector information and reference-frame index information of a single representative block of the group of blocks is buffered to be available for use as substitute or representative motion information for any of the blocks of the group of blocks during processing of subsequent frames. Also, the motion information for blocks in the group of blocks other than the representative block is discarded and not buffered in a buffer to be available for use during subsequent processing of other frames. That is to say, the motion information for one block that includes motion-vector information, reference-frame index information, and coding-mode information can be stored and used as a substituted or representative motion information for a whole group of blocks. A block can be a group of samples or pixels in a frame (e.g., a 4×4 block, an 8×8 block, a 16×16 block, and other such block arrangements). By using motion vectors, reference-frame indexes, and coding modes associated with a single block, the storing of mismatched motion information can be avoided. In one implementation the compressed motion information is stored before storing, in the buffer, the frame where the compressed motion information was derived from. In other implementations, the compressed motion information can be stored at some other time during the video decoding or encoding processes.

Compressing the motion information for a group of blocks can reduce the memory requirement for storing (e.g., buffering) the motion information for the group of blocks by reducing the number of motion vectors, reference frame indexes, and modes to be stored for the group of blocks. In one particular exemplary implementation, the representative reference-frame index information is the only reference-frame index information for the group of blocks that is buffered in the buffer during the processing of a current frame, and the representative reference motion-vector information is the only motion-vector information for the group of blocks that is buffered in the buffer during the processing of a current frame. For example, during processing (e.g., encoding or decoding) of a current frame, the reference-frame index information is stored in a buffer to represent the reference-frame index information for each of the blocks in the group of blocks. In some implementations, representative coding-mode information is also buffered for the group of blocks. For example, in one particular exemplary implementation, the representative coding-mode information is the only coding-mode information for the group of blocks that is buffered in the buffer during the processing of a current frame.

In other implementations, a current block is processed in part by using representative reference-frame index information from a block in the group of blocks other than the representative block and/or a current block is processed in part by using representative coding-mode information from a block in the group of blocks other than the representative block. In yet another implementation, a block in the group of blocks that has an available motion vector is selected as the representative block for the group of blocks.

B. Exemplary System for Using Motion Information

Figure 4:
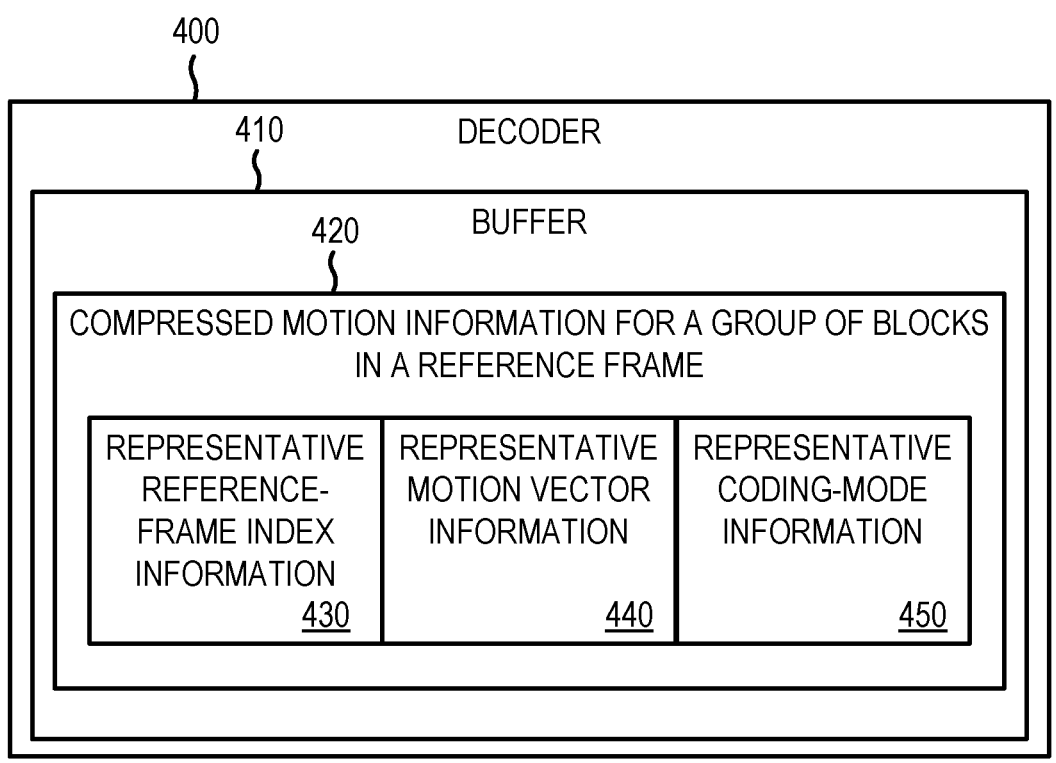
FIG. 4 is a schematic diagram of a decoder storing compressed motion information for a group of blocks.

FIG. 4 is a schematic diagram illustrating a decoder 400 that includes a buffer 410 storing compressed motion information 420 for a group of blocks in a reference frame. The motion information includes representative reference-frame index information 430 and representative motion-vector information 440. Also, in the example, the compressed motion information includes representative coding-mode information 450. In the illustrated embodiment, the representative coding-mode information 450 is also consistent with the representative reference-frame index information 430 and representative motion-vector information 450 such that it is from the same block of the group of blocks. Coding-mode information for a block can indicate a coding mode for the block. The coding mode can then be used to determine if a motion vector is or is not available (e.g., the motion vector exists or is stored) for the block. In one implementation, one of the available coding modes is an inter-prediction mode, which indicates that the block is coded using inter prediction (e.g., between frame/picture prediction). A block indicating that it is coded using inter-prediction coding can be decoded using one or more reference frames and using motion information, including one or more motion vectors and reference-frame indices. The one or more motion vectors and reference-frame indices used to decode the block in an inter-prediction mode can be included in the motion information for the block (e.g., representative index information 430, representative motion vector information 440). Another possible coding mode indicated by the coding-mode information is an intra-prediction mode, which indicates that the block is coded using intra prediction (e.g., within a frame/picture prediction). A block indicating that it is coded using intra-prediction coding can be decoded using information from the frame without using a motion vector, reference-frame index, or another frame. A block decoded using intra-prediction (e.g., a block of intra-prediction mode) does not have one or more motion vectors and/or reference-frame indices for the block. That is to say, no motion vectors or reference indices are used to decode the intra-prediction mode block.

C. Exemplary Method of Decoding a Compressed Video Bitstream

Figure 5:
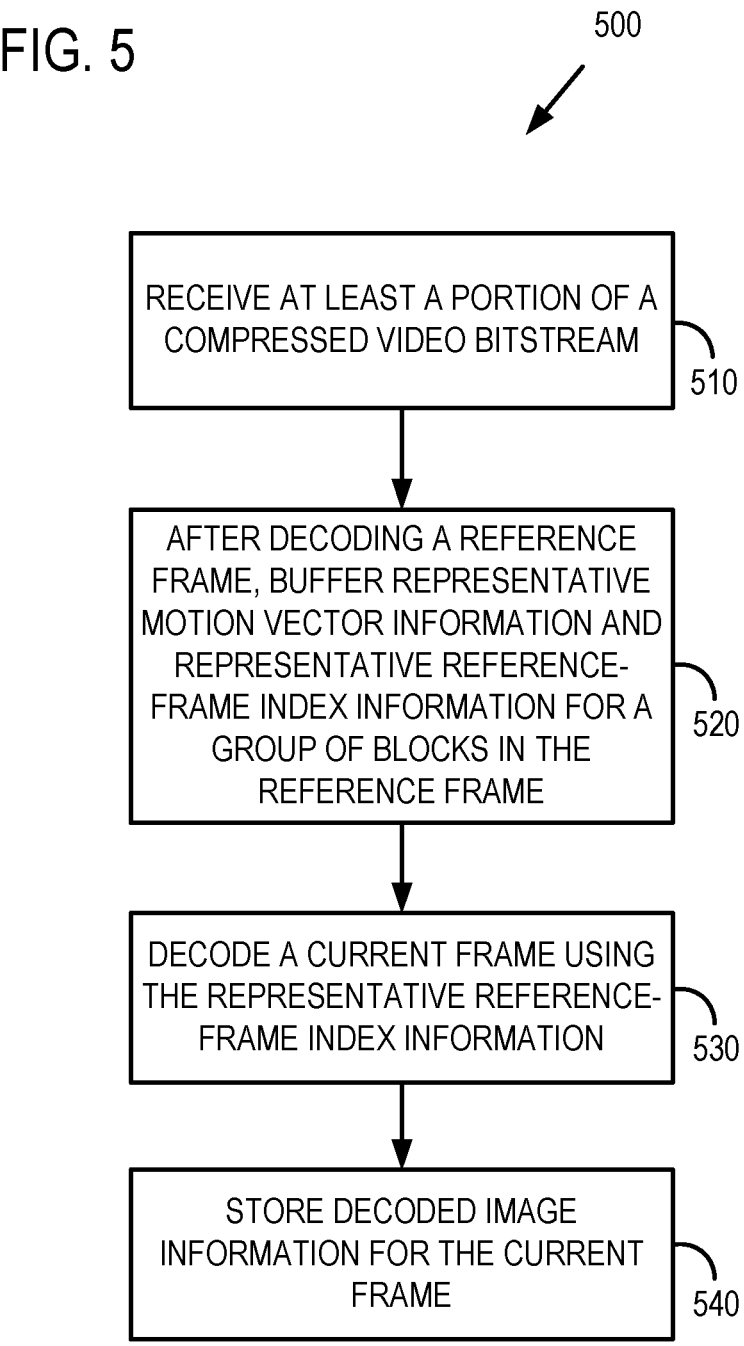
FIG. 5 is a flowchart of an exemplary method of decoding a compressed video bitstream.

FIG. 5 is a flowchart of an exemplary method 500 of decoding a compressed video bitstream. In the exemplary method, at least a portion of a compressed video bitstream is received at 510. For example, the compressed video bitstream can be encoded according to a video coding format such as HEVC or some other video coding format. In one implementation, one or more coded frames are included in the compressed video bitstream. At 520, representative motion-vector information and representative reference-frame index information for a group of blocks in a reference frame is buffered after the reference frame is decoded. For example, the representative motion-vector information and representative reference-frame index information can be consistent such that they are from the same block (e.g., a representative block) in the reference frame. The reference frame can be a video frame decoded from the compressed video bitstream. In certain implementations, the reference frame contains samples or blocks that can be used for inter prediction decoding of samples or blocks in another frame (e.g., a currently decoded frame), or the reference frame contains representative motion-vector information and representative reference-frame index information. The reference frame index can reference which other reference frame to use when multiple reference frames are available. For example, a reference-frame index can be an index into a list of reference frames (e.g., a reference frame list) that references a particular reference frame in the list of reference frames. In one implementation, the reference-frame index is used to reference a reference frame that is used with a motion vector to locate a block or other group of samples or pixels in the reference frame. The reference frame list is a list of reference frames that can be used in inter prediction of another frame (e.g., a P or B frame) or slice. For example, the slice can be a group of a number (e.g., an integer number) of blocks in a frame ordered consecutively according to a raster scan. In some implementations, there can be one reference frame list for uni-prediction of a P slice and two reference frame lists for bi-prediction of a B slice.

With reference to FIG. 5, at block 530, a current frame is decoded. In certain implementations, during the decoding, the reference-frame index information buffered in the buffer for the group of blocks is used as the representative reference-frame index information. For example, the buffered reference-frame index information can be used as reference-frame index information for a co-located block in the reference frame that is co-located with the current block in the current frame. In some implementations, the co-located block is a different block than the representative block. Further, in particular implementations, the reference-frame index information comprises a single reference-frame index for the group of blocks and is from a representative block. For example, a current block in the current frame can be decoded using a reference frame, and the reference frame can include a group of blocks that includes a block co-located with the current block. The group of blocks can further include representative reference-frame index information from a representative block in the group of blocks that is used as the reference-frame index information for the entire group of blocks. Accordingly, during the decoding of the current block, the representative reference-frame index information for the group of blocks is used as reference-frame index information for a co-located block in the reference frame that is co-located with the current block in the current frame. For example, during motion vector prediction for a current block in a current frame, when motion information for the co-located block in the reference frame is to be used, the stored representative motion information (e.g., the motion information of the representative block) is substituted and actually used. In some implementations of motion vector prediction, motion information from a previously decoded block (e.g., a block in the same frame or different frame) is used to predict the motion information for a unit (e.g., block, slice, or other unit) in a current frame. For example, temporal motion vector prediction (TMVP) uses motion information from a unit (e.g., a block) in a reference frame (e.g., a previously decoded frame) to predict the motion information for a unit in a current frame. Further, when a temporal motion vector is used to determine a prediction for a block, the motion vector for a co-located block in a reference frame different than the current frame can be used as the temporal motion vector. In some implementations, the co-located block in the reference frame is co-located with the unit in the current frame. For instance, the co-located block can be a block in a reference frame that has an upper-left corner or upper-left pixel or sample with the same spatial coordinates of an upper-left corner or upper-left pixel of a current block in a current frame. In some implementations, the co-located block can be a different sized block than the block in the current frame with which it is co-located. For example, the co-located block in the reference frame can be a 4×4 block and the block in the current frame that it is co-located with can be a block of a different size (e.g., a block having more or less pixels or samples). In addition to square blocks, which have the same amount of horizontal pixels as vertical pixels, blocks can be rectangular. A rectangular block can have more or less horizontal pixels than vertical pixels (e.g., 16×32, 32×16, 16×8, 8×16, or other sizes). In a further implementation, during decoding, the motion information of the representative block can be used to determine a prediction for the current block. The prediction can be an estimate of sample values or data elements of the block currently being decoded.

At block 540, decoded video information for the current frame is stored. For example, the decoded frame is stored in a decoded picture buffer or some other store.

Figure 6:
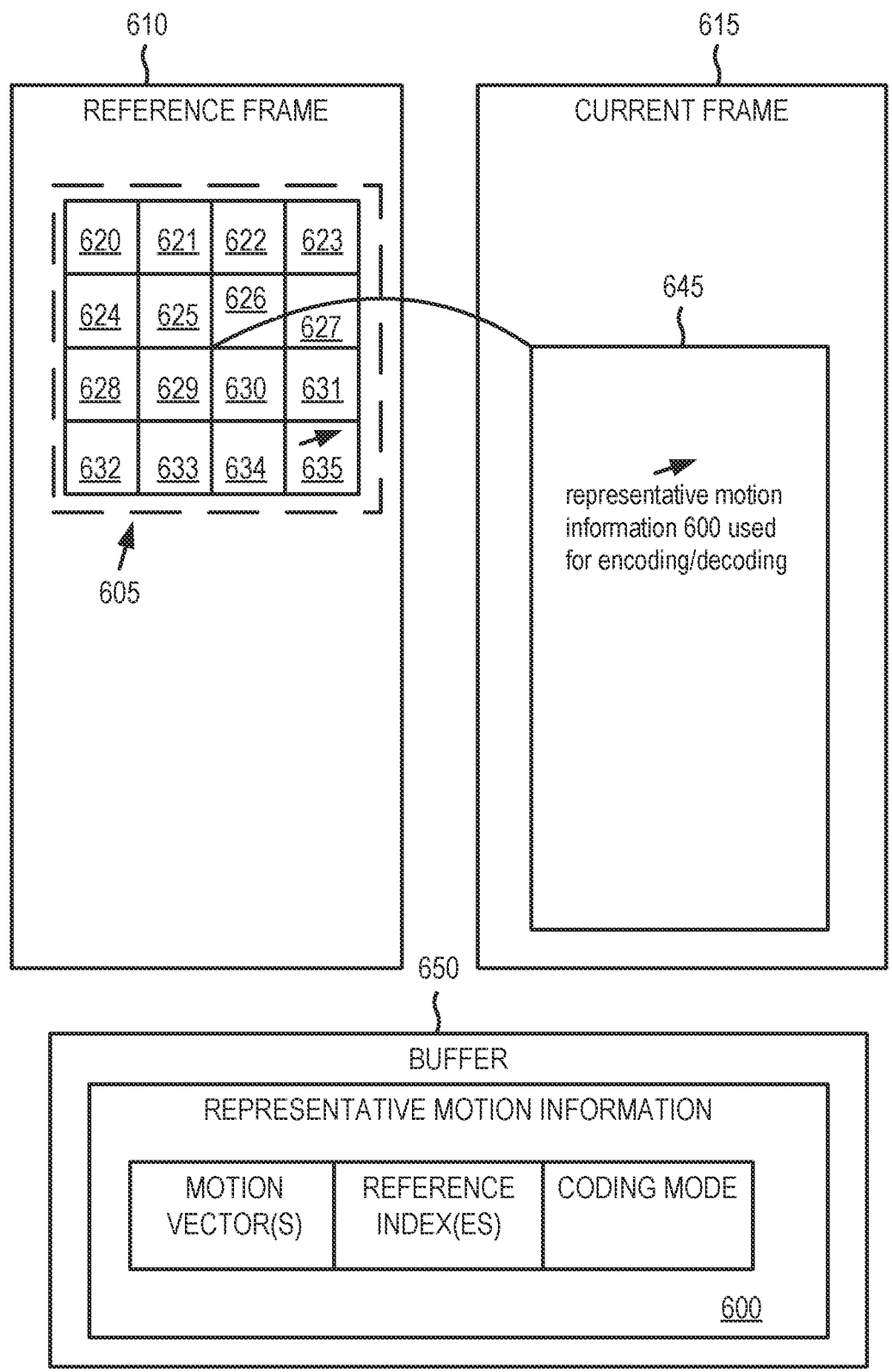
FIG. 6 is a schematic diagram illustrating using representative motion information for a group of blocks.

FIG. 6 is a schematic diagram that illustrates using representative motion information 600 for a group of blocks 605 in a reference frame 610 during motion vector prediction for a current frame 615. Storing motion information and reference frame information during encoding and decoding can consume a large amount of memory resources. For example a unit can be a 4×4 pixel block, such as block 620. To store such a 4×4 block in a buffer costs 24 bytes for a 4:2:0 format when the pixels are 1.5 bytes or 12 bpp. For a P-frame there can be one motion vector for a block, and for a B-frame there can be two motion vectors for a block. A motion vector includes two components which include a horizontal displacement component and a vertical displacement component. Therefore, for one 4×4 block in a B-frame, when an integer is stored using 2 bytes, it will cost 8 bytes of memory to save the motion vector, which is ⅓ the storage cost of the pixels of the 4×4 block at 24 bytes. Additional memory is consumed by storing the coding-mode information and reference-frame index information for the block. By compressing motion information, the memory requirement for buffering the motion information for a group of blocks can be reduced. In compressing motion information, some motion vectors for a group of blocks are discarded and not stored in memory during subsequent encoding/decoding of other frames to reduce the memory requirement for storing the motion information for the group of blocks.

With reference to FIG. 6, the group of blocks 605 is a macro-block that is a 16×16 pixel block that includes 16 4×4 sub-blocks 620-635. During encoding or decoding, instead of buffering motion vectors for each of the 4×4 sub-blocks within the group of blocks 605 in buffer 650, only the motion information of one of the sub-blocks in the group of blocks 605, such as representative block 635 or other representative block of the group of blocks 605, is stored as representative motion information 600. In the illustrated embodiment, the representative block 635 is the last block in the group of blocks 605 (e.g., the lowermost and rightmost block in the group of blocks 605). The motion information of the representative block 635 is stored as representative motion information and later used as motion information for any of the sub-blocks of the group of blocks 605 during subsequent processing of frames. That is to say that only the motion information for the representative block 635 is stored to represent the motion information for all of the 4×4 pixel sub-blocks within the 16×16 pixel macro-block. For a 16×16 macro-block such as the group of blocks 605, by compressing motion information, the memory requirement for storing motion information for the group of blocks can be reduced to $\frac{1}{16}^{th}$ the memory requirement of storing the motion information for each of the sub-blocks of the group of blocks 605. For example, if all of the 16 sub-blocks are inter-prediction mode blocks in a P-frame, storing motion information for each of the 16 sub-blocks consumes memory resources to hold 16 motion vectors, 16 reference indices, and 16 coding modes. Storing compressed motion information for this group of blocks consumes an amount of memory resources that holds motion information for one of the blocks which includes 1 motion vector, 1 reference-frame index, and 1 coding mode. In other implementations, not all blocks of a group of blocks have motion vectors and/or reference-frame indices and compressing the motion information for the group of blocks produces a same or different (e.g., higher or lower) memory saving ratio.

When motion information for any of the particular blocks (e.g., any of the respective blocks of the group of blocks) in the group of blocks 605 is needed for use or used during subsequent encoding or decoding, the stored representative motion information 600 (the representative motion information from the representative block, such as the last block in the group of blocks 605 (e.g., the lowermost and rightmost block 635 in the group of blocks 605)) is used instead. That is to say, once the representative motion information 600 is buffered, processing of subsequent frames can use the representative motion information 600 as motion information for any of the 16 blocks of the group of blocks 605. For example, during decoding for the current block 645 in the current frame 615 (e.g., during temporal motion vector prediction or some other decoding process), motion information of a co-located block such as block 630 in the group of blocks 605 can be requested for use in the decoding. Because block 630 is co-located with current block 645 the motion information for block 630 is requested for use, but instead the representative motion information 600 is used as the motion information for block 630 in the decoding of the current block 645. In the example of FIG. 6, the buffered representative information 600 includes a motion vector, a reference-frame index, and a coding mode that are the motion information for the representative block 635. In other implementations, the representative motion information 600 of the representative block can be different or the same as the motion information of the representative block 635 (e.g., the motion information can be from any one of blocks 620-635).

D. Exemplary System for Decoding a Current Frame of Video

Figure 7:
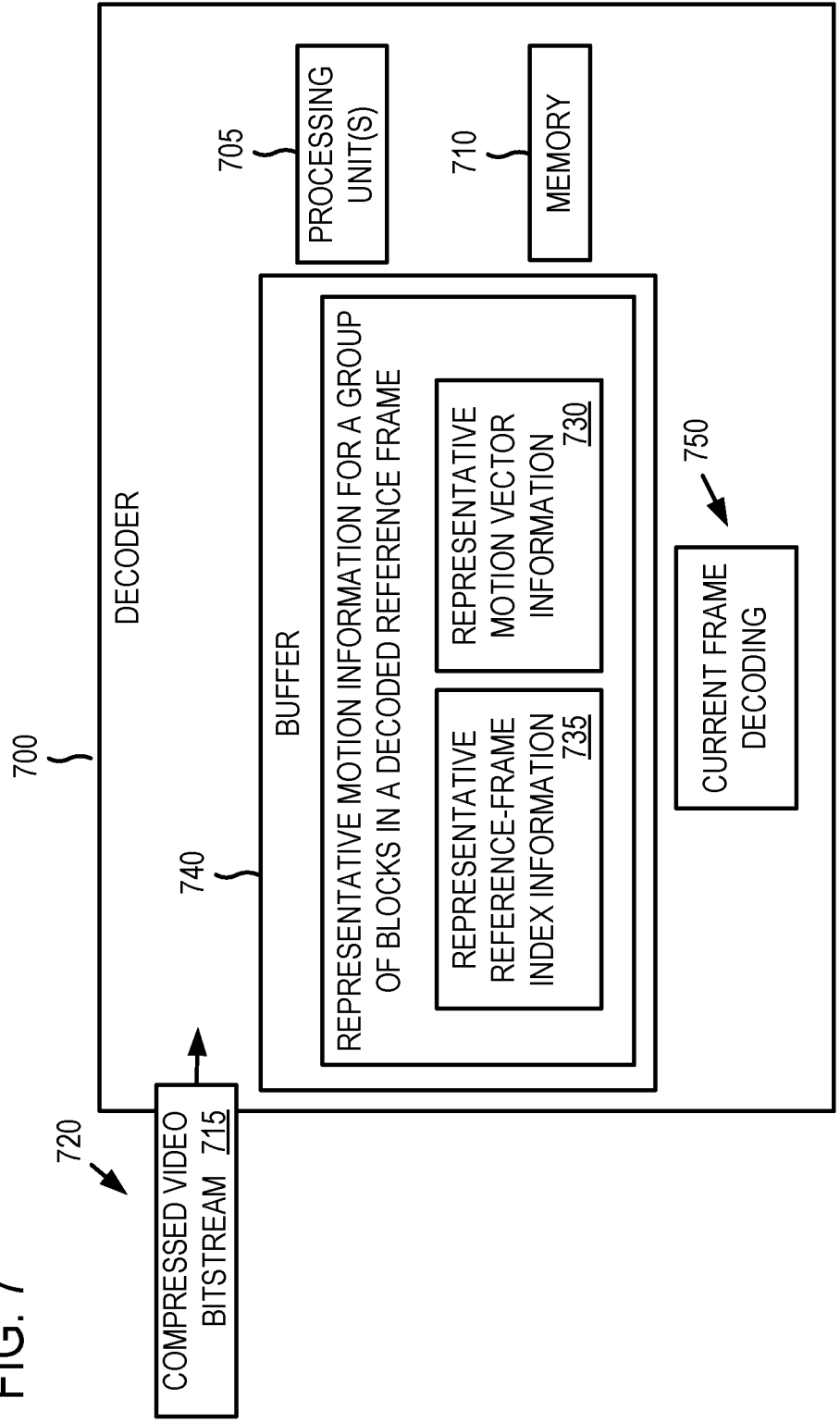
FIG. 7 is a schematic diagram of an exemplary decoder capable of decoding video information.

FIG. 7 is a schematic diagram of an exemplary decoder 700 capable of decoding a current frame of video. The decoder 700 includes one or more processing units 705 and a memory 710. The one or more processing units are at least configured to decode video information. In the decoding, the decoder 700 receives at least a portion of a compressed video bitstream 715 at 720. Also, representative motion-vector information 730 and representative reference-frame index information 735 for a group of blocks in a decoded reference frame is buffered in buffer 740. The representative reference-frame index information 735 includes reference-frame index information of a representative block of the group of blocks in the reference frame. Additionally, at 750, a current frame is decoded by the decoder 700 and the representative reference-frame index information is the only reference-frame index information for the group of blocks that is buffered during the decoding of the current frame. In some implementations, representative coding-mode information for the group of blocks in the decoded reference frame is buffered in buffer 740.

E. Exemplary Method of Decoding a Compressed Video Bitstream

Figure 8:
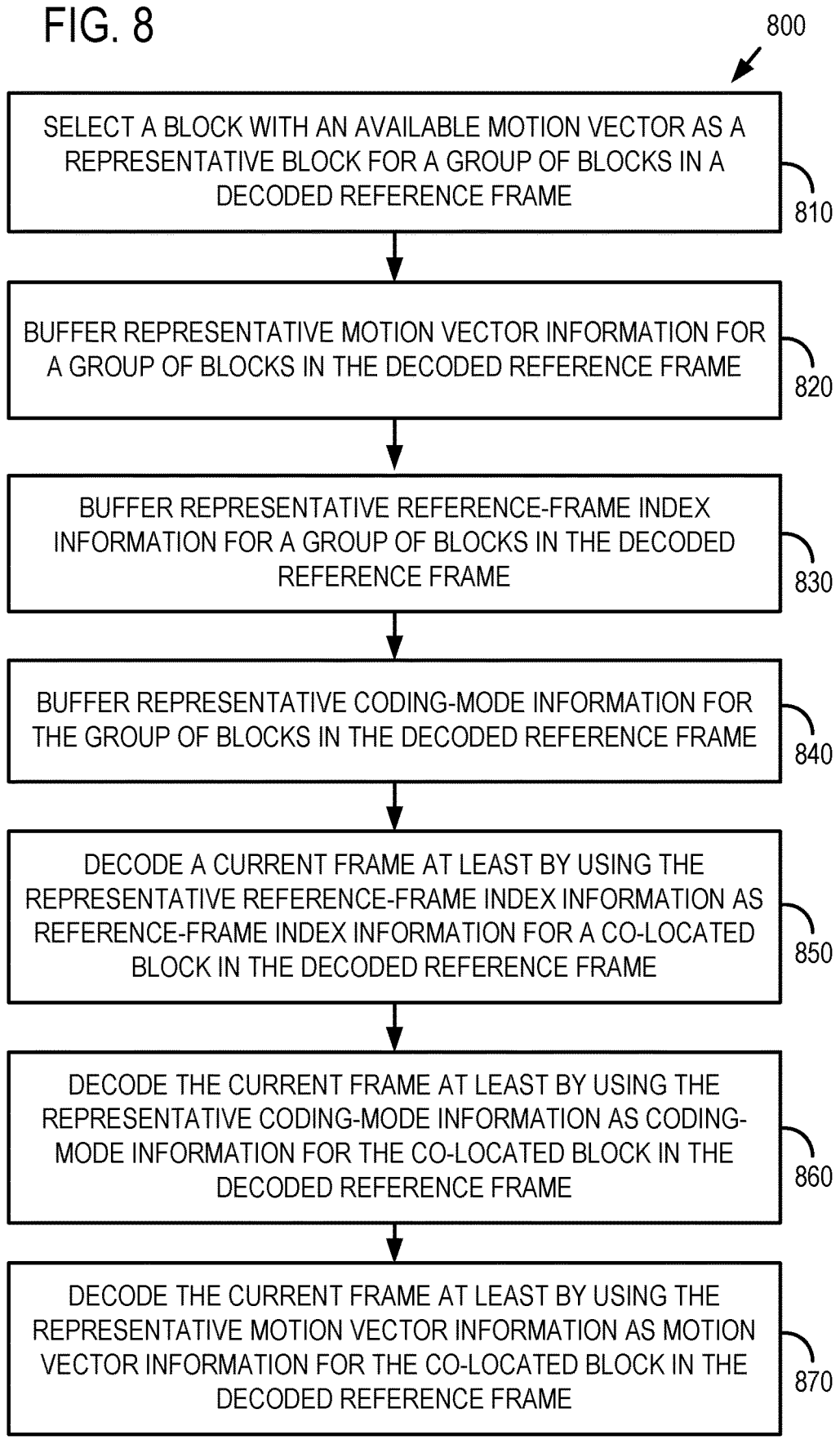
FIG. 8 is a flowchart of an exemplary method of decoding video information.

FIG. 8 is a flowchart of an exemplary method 800 of decoding a current frame of video. In the illustrated example, a block with an available motion vector is selected as a representative block for a group of blocks in a previously decoded reference frame at block 810. For example, any block of the group of blocks that has an available motion vector can be selected as the representative block. In some implementations the selection can be a default selection where a predetermined block is selected as the representative block. For example, the first block of the group of blocks can be the default selection for the representative block. In another example, the last block of the group of blocks can be a default selection for the representative block. In other implementations, respective other blocks in the group of blocks are the default selection for the representative block.

In some implementations, the representative block is selected by scanning or searching the group of blocks for a block with an available motion vector. For example, the group of blocks can be scanned in a predetermined or fixed order. In some implementations, the scanning of the blocks continues until a block is scanned which has an available motion vector. For example, the first block scanned with an available motion vector is selected. In another implementation, the scanning can begin from the first block, the last block, or some other block. For example, the blocks can be scanned from the first block toward the last block, or scanned from the last block toward the first block. In some implementations, each block scanned is adjacent to the previously scanned block. In another implementation, if a predetermined or default block is to be selected as the representative block, but the predetermined block does not have an available motion vector (e.g., the block is coded using intra prediction), the rest of the blocks can be scanned to find a block that has available motion information for motion vector prediction. In another implementation, the blocks are scanned by scanning one block per coding mode region of the group of blocks. For example, a coding mode region of the group of blocks can be a sub-group of blocks (e.g., 4 4×4 blocks that comprise a 8×8 block or some other sub-group of blocks) that have the same coding mode. In one implementation, a coding mode region that includes a block of intra-prediction mode indicates that the blocks of the mode region are predicted using intra prediction and do not have associated motion vectors, or reference indices that can be used for prediction of another block's motion vector or motion vectors. Scanning one block of a coding mode region of intra-prediction mode blocks is sufficient to indicate that no available motion vector can be found in the mode region, and the other blocks of the coding mode region can be skipped by the scanning. In one example, a mode region that includes a block of inter-prediction mode indicates that the blocks of the mode region are predicted using inter prediction, so by scanning one block of the mode region is sufficient to find a block with an available motion vector for motion vector prediction.

With reference to FIG. 8, at block 820, representative motion-vector information for a group of blocks in the decoded reference frame is buffered. In particular implementations, the representative motion-vector information for the group of blocks can be the motion-vector information for the last block in the group of blocks (e.g., the lowermost and rightmost block in the group of blocks). At block 830, representative reference-frame index information for a group of blocks in the decoded reference frame is buffered. In particular implementations, the representative reference-frame index information for the group of blocks can be the reference-frame index information for the last block in the group of blocks (e.g., the lowermost and rightmost block in the group of blocks). At block 840, representative coding-mode information for the group of blocks in the decoded reference frame is buffered. In particular implementations, the representative coding-mode information for the group of blocks can be the coding-mode information for the last block in the group of blocks (e.g., the lowermost and rightmost block in the group of blocks). At block 850, a current frame is decoded at least in part by using the representative reference-frame index information as reference-frame index information for a co-located block in the decoded reference frame. In some implementations, the decoding of frames can be in a different order than the received order or display order of the frames of the video. In another implementation the representative block is a different block than the co-located block in the reference frame. At block 860, the current frame is decoded at least in part by using the representative coding-mode information as coding-mode information for the co-located block in the decoded reference frame. For example, the coding-mode information can be checked or used during temporal motion vector prediction to determine if there is available motion information for the group of blocks (e.g., the coding mode is checked to determine if the coding mode indicates an inter-prediction mode or intra-prediction mode). The current frame can also be decoded at least in part by using the representative motion-vector information as motion-vector information for the co-located block in the decoded reference frame as shown at block 870.

Figure 9:
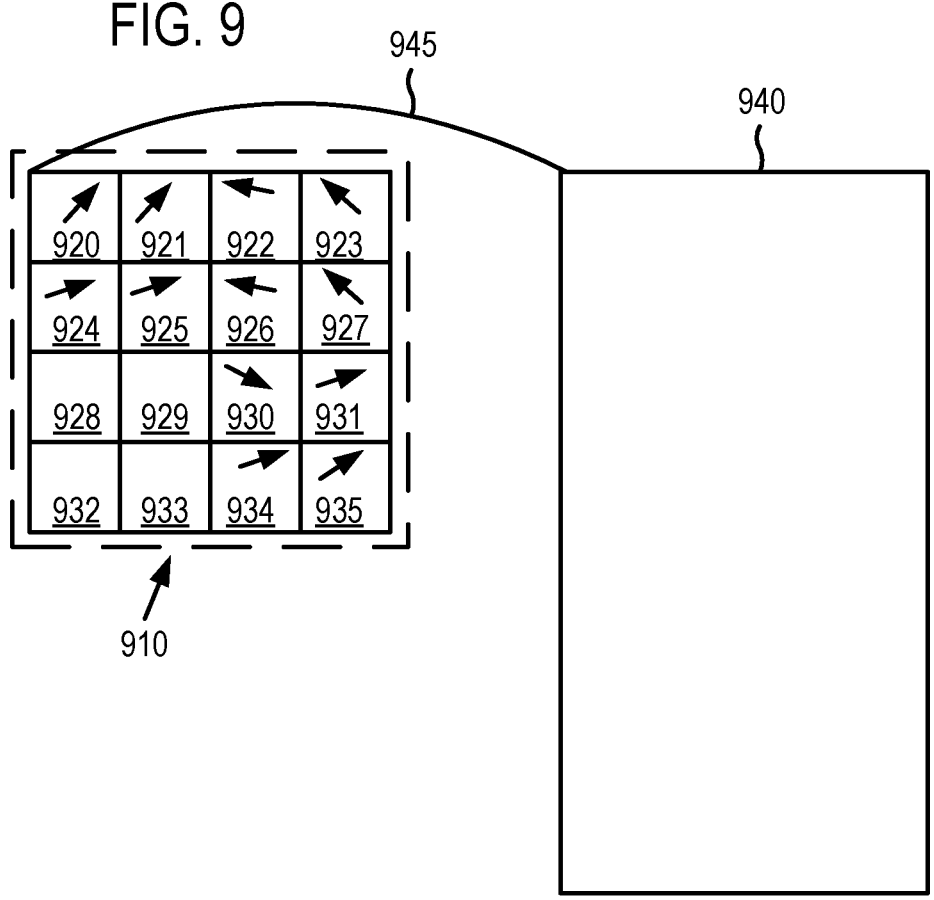
FIG. 9 is a schematic diagram illustrating selection of a representative block for a group of blocks according to an embodiment of the disclosed technology.

FIG. 9 is a schematic diagram that illustrates the process of selecting a representative block for a group of blocks 910. In the figure, the group of blocks 910 is a 16×16 pixel macro block comprised of 16 4×4 pixel sub-blocks 920-935. The group of blocks 910 is organized in columns and rows. In the illustration of the group of blocks 910, each small box illustrates a 4×4 pixel block. In some implementations, the ordering of the blocks can be in a raster scan order. For example, the first block such as block 920 can be the leftmost block in the first row, and the last block such as block 935 can be the rightmost block in the last row.

Block 935 is predicted using inter prediction and has available motion-vector information, reference-frame index information, and coding-mode information that can be used for motion vector prediction of another block in a current frame, such as current block 940. When the spatial position of a representative block is closer to the centroid of a current block in a current frame, the prediction for the current block can be better. By choosing the last 4×4 block as the representative block of a 16×6 pixel macro-block comprised of 4×4 pixel blocks, the representative block can provide a better prediction for a current block that is larger than a 16×16 pixel block. For example, the last block 935 in the group of blocks 910 is spatially closer, in its frame, to the location of the centroid of the current block 940 than is the first block 920 in the group of blocks. The current block 940 in the current frame is a 32×16 pixel block that is co-located with the first block 920. As co-located frames, the upper left corners of the first block 920 and the current block 940 have the same spatial position in their respective frames which is represented by the illustrated arc 945. In another example, by choosing the last 4×4 pixel block in a 16×16 pixel block as the representative block, the spatial position of the representative block is also closer than the first block to the centroid for a current frame that is a 16×32 pixel block which is co-located with the first block in the reference frame. When a video coding format (e.g., HEVC or other video coding format) uses many large size blocks, choosing the last block of a group of blocks to be the representative block for compressed motion information for motion vector prediction can be better than choosing the first block of the group of blocks as the representative block.

Figure 10:
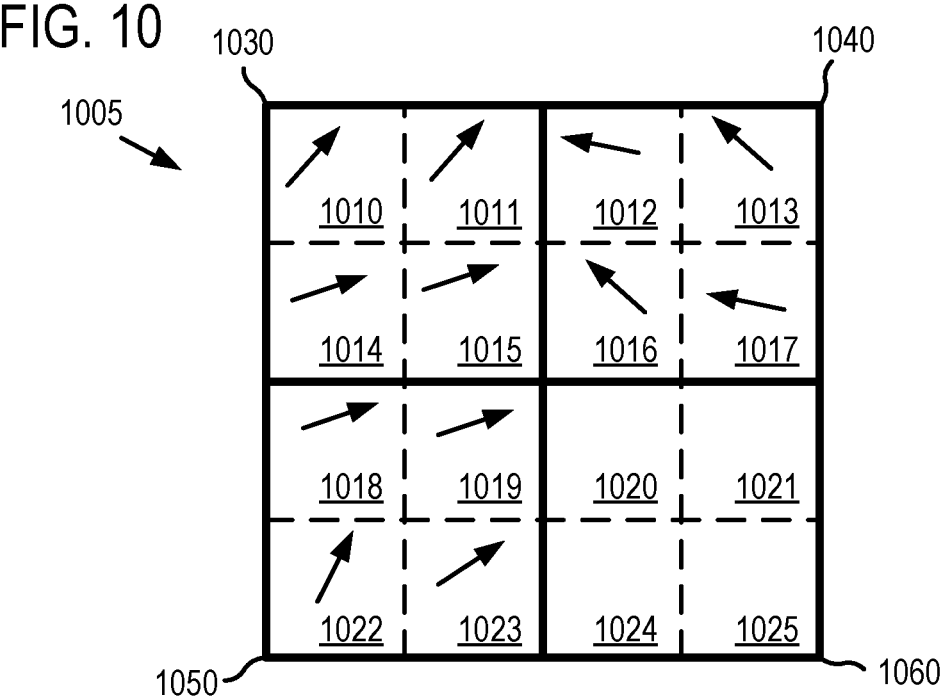
FIG. 10 is a schematic diagram illustrating selection of a representative block for a group of blocks by scanning according to an embodiment of the disclosed technology.

FIG. 10 is a schematic diagram that illustrates selecting a representative block for a group of blocks 1005 by scanning. In the example, the group of blocks 1005 is a 16×16 pixel block comprising 16 4×4 pixel blocks 1010-1025. In other implementations, a group of blocks can be different sizes. The blocks 1010-1019 and blocks 1022-1023 are predicted using inter prediction (e.g., blocks of inter-prediction mode) and have motion-vector information that can be used in motion vector prediction (e.g., temporal motion vector prediction) for another block in a different frame. In the illustrated embodiment, the blocks 1020-1021 and blocks 1024-1025 are predicted using intra prediction (e.g., blocks of intra-prediction mode) and do not have associated motion-vector information (e.g., one or more motion vectors) that can be used in motion vector prediction (e.g., temporal motion vector prediction) for another block in a different frame. In one example, a motion vector can be a two-dimensional value, having a horizontal component that indicates left or right special displacement and a vertical component that indicates up or down spatial displacement.

To select a representative block for the group of blocks 1005, the blocks are scanned. During the scanning the scanned blocks are checked to determine if there is motion information available (e.g., there is a motion vector stored or otherwise available, or the block is of inter-prediction mode) for the block. If there is motion-vector information available for a scanned block the block can be chosen as a representative block. If none of the blocks have valid (e.g., available) motion information, then a predetermined motion vector (e.g., a (0, 0) motion vector or some other motion vector) can be stored to represent the motion information for the group of blocks. In the example of FIG. 10, the blocks are scanned starting from the last block which is block 1025, and are scanned toward the first block which is block 1010. The group of blocks is scanned by regions of blocks having like modes. In other implementations, the group of blocks are scanned consecutively in a raster scan order or in the reverse of a raster scan order from a starting block toward another block, and the scanning ends when a block is found (e.g., the first block found) that has an available motion vector that can be selected as a representative block. Scanning consecutively can be either in an ascending order or descending order. That is to say the blocks can be scanned either forward or backwards.

In FIG. 10, the regions of blocks having alike coding modes are mode regions 1030, 1040, 1050, 1060. The respective blocks that comprise the mode regions 1030, 1040, 1050, and 1060 are indicated in FIG. 10 as being within the solid lines and connected by dotted lines. For example, the dotted lines of region 1030 are between the connected blocks 1010, 1011, 1014, and 1015. In the example of FIG. 10, the scanning of the group of blocks starts at block 1025 which is the last block of the group. Block 1025 is an intra-prediction mode block and therefore has no valid motion vector. As block 1025 has no valid motion vector, the scanning skips over the other blocks of mode region 1060 and continues to the first block in the next mode region in the consecutive ordering of the blocks from the last block toward the first block to scan block 1023. Block 1023 is an inter-prediction mode block and has a valid motion vector, so the scanning ends and block 1023 is selected as the representative block for the group of blocks 1005. In other implementations, the scanning continues to find a different block with an available motion vector. For example, if block 1023 did not have an available motion vector, one block (e.g., only one block) per mode region can be scanned until a scanned block is found that has a valid motion vector.

III. Exemplary Computing Environment

Figure 11:
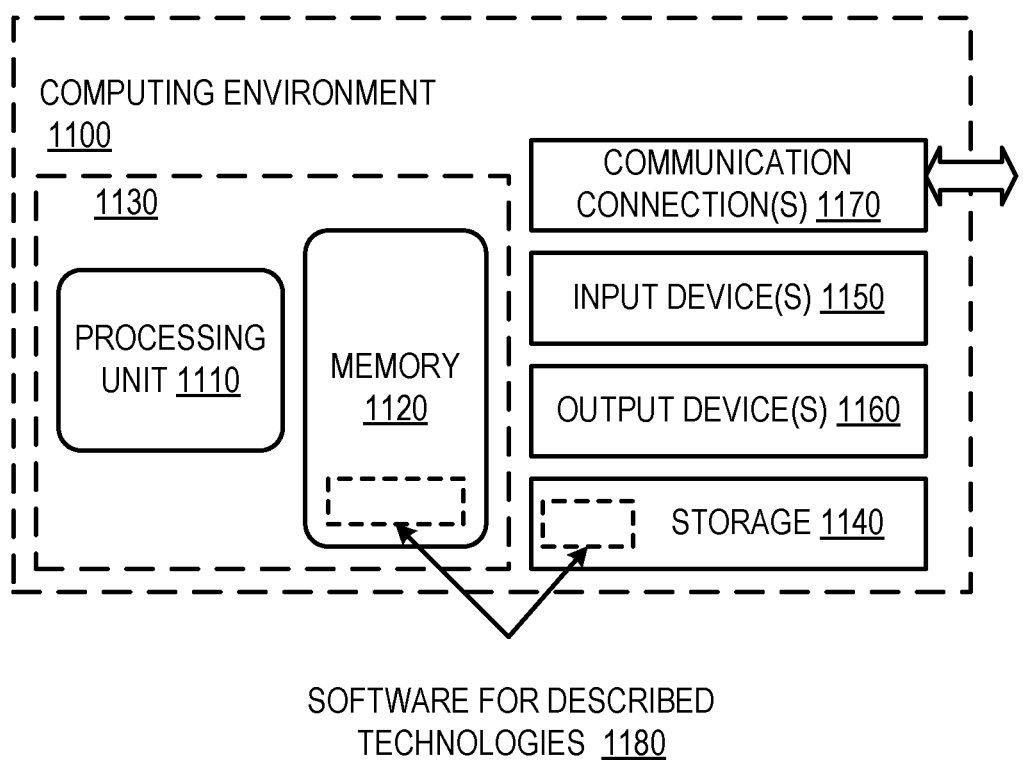
FIG. 11 is a schematic diagram illustrating a generalized example of a suitable computing environment for any of the disclosed embodiments.

FIG. 11 illustrates a generalized example of a suitable computing environment 1100 in which herein described embodiments, techniques, solutions, and technologies may be implemented. The computing environment 1100 is not intended to suggest any limitation as to scope of use or functionality of the technology, as the technology may be implemented in diverse general-purpose or special-purpose computing environments. For example, the disclosed technology may be implemented using one or more computing devices comprising a processing unit, memory, and storage storing computer-executable instructions implementing the technologies described herein. For example, computing devices include server computers, desktop computers, laptop computers, notebook computers, netbooks, tablet computers, mobile devices, PDA devices and other types of computing devices (e.g., devices such as televisions, media players, or other types of entertainment devices that comprise computing capabilities such as audio/video streaming capabilities and/or network access capabilities). The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices. Additionally, the techniques, technologies, and solutions described herein can be performed in a cloud computing environment (e.g., comprising virtual machines and underlying infrastructure resources).

With reference to FIG. 11, the computing environment 1100 includes at least one central processing unit 1110 and memory 1120. In FIG. 11, this basic configuration 1130 is included within a dashed line. The central processing unit 1110 executes computer-executable instructions. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other tangible storage medium which can be used to store information and which can be accessed within the computing environment 1100. The storage 1140 stores computer-executable instructions for the software 1180, which can implement technologies described herein.

The input device(s) 1150 may be a touch input device, such as a keyboard, keypad, mouse, touch screen, controller, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, DVD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, compressed or uncompressed video information, or other data in a modulated data signal.

IV. Further Considerations

Any of the disclosed methods can be implemented as computer-executable instructions stored on one or more computer-readable media (tangible computer-readable storage media, such as one or more optical media discs, volatile memory components (such as DRAM or SRAM), or non-volatile memory components (such as hard drives)) and executed on a computing device (e.g., any commercially available computer, including smart phones or other mobile devices that include computing hardware). By way of example, computer-readable media include memory 1120 and/or storage 1140. As should be readily understood, the term computer-readable media does not include communication connections (e.g., 1170) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

We claim:

1. A computer system comprising:
 a video encoder, implemented using one or more processing units of the computer system, configured to perform operations comprising:
  encoding a first frame of a video sequence, thereby producing a first portion of encoded data;

reconstructing the first frame;
buffering, in memory, the first frame for use as a reference frame;
buffering, in memory, representative motion vector information and representative reference frame index information for the reference frame, including buffering representative motion vector information and representative reference frame index information for a group of blocks in the reference frame, wherein the representative reference frame index information for the group of blocks is reference frame index information of a representative block of the group of blocks, and wherein the representative motion vector information for the group of blocks is a motion vector of the representative block of the group of blocks; and
encoding a second frame of the video sequence, thereby producing a second portion of the encoded data, including using the motion vector and the reference frame index information of the representative block of the group of blocks to encode a block of the second frame; and
a buffer, implemented using memory of the computer system, configured to store the encoded data for output.

2. The computer system of claim 1, wherein the block of the second frame has a co-located block in the reference frame, and wherein the co-located block in the reference frame is a different block than the representative block of the group of blocks.

3. The computer system of claim 2, wherein the co-located block in the reference frame and the representative block of the group of blocks have different sizes.

4. The computer system of claim 2, wherein the co-located block in the reference frame and the representative block of the group of blocks have different top-left corner positions in the reference frame.

5. The computer system of claim 1, wherein the operations further comprise:
buffering, in memory, representative coding mode information for the reference frame, including buffering representative coding mode information for the group of blocks in the reference frame, wherein the representative coding mode information for the group of blocks is coding mode information of the representative block of the group of blocks.

6. The computer system of claim 5, wherein the coding mode information of the representative block of the group of blocks indicates whether the representative block of the group of blocks was encoded using intra prediction or inter prediction.

7. In a computer system that implements a video decoder, a method comprising:
receiving encoded data in a bitstream for at least part of a video sequence;
decoding a first frame of the video sequence using a first portion of the encoded data;
buffering, in memory, the first frame for use as a reference frame;
buffering, in memory, representative motion vector information and representative reference frame index information for the reference frame, including buffering representative motion vector information and representative reference frame index information for a group of blocks in the reference frame, wherein the representative reference frame index information for the group of blocks is reference frame index information of a representative block of the group of blocks, and wherein the representative motion vector information for the group of blocks is a motion vector of the representative block of the group of blocks; and
decoding a second frame of the video sequence using a second portion of the encoded data, including using the motion vector and the reference frame index information of the representative block of the group of blocks to reconstruct a block of the second frame.

8. The method of claim 7, wherein the motion vector of the representative block of the group of blocks is the only motion vector information buffered for the group of blocks during the decoding the second frame, and wherein the reference frame index information of the representative block of the group of blocks is the only representative reference frame index information buffered for the group of blocks during the decoding the second frame.

9. The method of claim 7, wherein the block of the second frame has a co-located block in the reference frame, and wherein the co-located block in the reference frame is a different block than the representative block of the group of blocks.

10. The method of claim 9, wherein the co-located block in the reference frame and the representative block of the group of blocks have different sizes.

11. The method of claim 9, wherein the co-located block in the reference frame and the representative block of the group of blocks have different top-left corner positions in the reference frame.

12. The method of claim 7, further comprising:
buffering, in memory, representative coding mode information for the reference frame, including buffering representative coding mode information for the group of blocks, wherein the representative coding mode information for the group of blocks is coding mode information of the representative block of the group of blocks.

13. The method of claim 12, wherein the decoding the second frame further includes using the coding mode information of the representative block of the group of blocks to reconstruct the block of the second frame.

14. The method of claim 12, wherein the coding mode information of the representative block of the group of blocks indicates whether the representative block of the group of blocks was encoded using intra prediction or inter prediction.

15. The method of claim 7, wherein the using the motion vector to reconstruct the block of the second frame includes using the motion vector to determine a temporal motion vector prediction for the block of the second frame.

16. The method of claim 7, further comprising:
selecting a rightmost block in a last row of the group of blocks or a leftmost block in a first row of the group of blocks as the representative block of the group of blocks.

17. The method of claim 7, wherein the representative motion vector information and the representative reference frame index information for the reference frame are buffered for 16×16 blocks in the reference frame.

18. The method of claim 7, wherein the representative reference frame index information of the representative block of the group of blocks is an index in a list of reference frames.

19. One or more non-transitory computer-readable media having stored thereon encoded data in a bitstream for at least part of a video sequence, the encoded data being formatted to facilitate decoding, with a video decoder, by operations comprising:

decoding a first frame of the video sequence using a first portion of the encoded data;

buffering, in memory, the first frame for use as a reference frame;

buffering, in memory, representative motion vector information and representative reference frame index information for the reference frame, including buffering representative motion vector information and representative reference frame index information for a group of blocks in the reference frame, wherein the representative reference frame index information for the group of blocks is reference frame index information of a representative block of the group of blocks, and wherein the representative motion vector information for the group of blocks is a motion vector of the representative block of the group of blocks; and decoding a second frame of the video sequence using a second portion of the encoded data, including using the motion vector and the reference frame index information of the representative block of the group of blocks to reconstruct a block of the second frame.

20. The one or more non-transitory computer-readable media of claim 19, wherein the block of the second frame has a co-located block in the reference frame, and wherein the co-located block in the reference frame is a different block than the representative block of the group of blocks.

* * * * *